(No Model.)
B. ELMORE.
MOWING MACHINE.
No. 334,762. Patented Jan. 26, 1886.
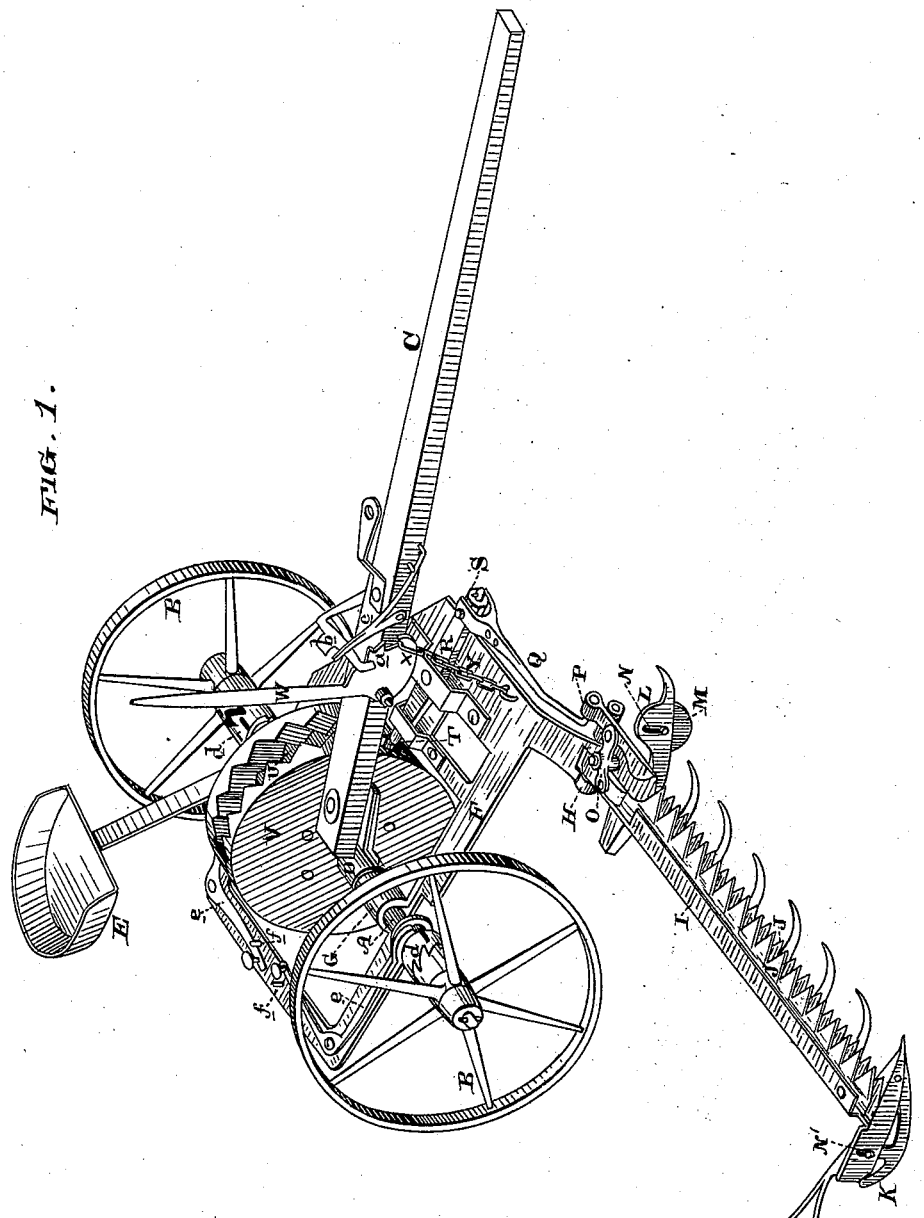
Witnesses,
Geo. H. Strong.
J. H. Rouse.
Inventor,
B. Elmore
By Dewey & Co.
Attorneys

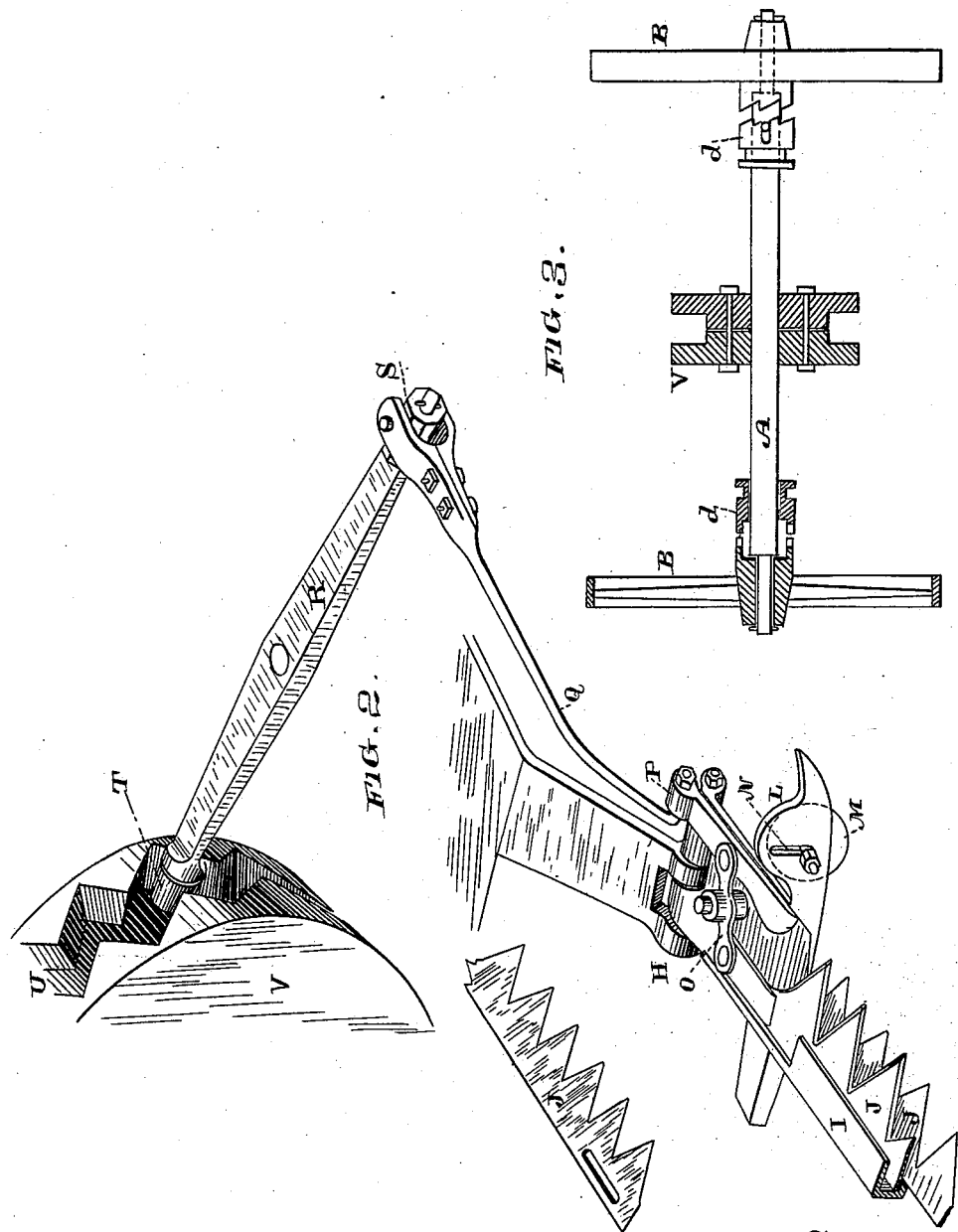

UNITED STATES PATENT OFFICE.

BENTON ELMORE, OF SHASTA, CALIFORNIA.

MOWING-MACHINE.

SPECIFICATION forming part of Letters Patent No. 334,762, dated January 26, 1886.

Application filed February 12, 1885. Serial No. 155,747. (No model.)

*To all whom it may concern:*

Be it known that I, BENTON ELMORE, of Shasta, Shasta county, State of California, have invented an Improvement in Mowing-Machines; and I hereby declare the following to be a full, clear, and exact description of the same.

My invention relates to certain improvements in mowing-machines; and it consists in the combination of devices and in certain details of construction, which will be hereinafter claimed, and more fully explained by reference to the accompanying drawings, in which—

Figure 1, Sheet 1, is a perspective view of my apparatus. Fig. 2 is an enlarged view of the vibrating sickle-driving lever, connecting-rods, and joints. Fig. 3 is a section of the cam and wheel-hub.

A is the axle; B B, the bearing-wheels of my machine, which turn loosely upon the outer end of the axle.

C is the pole, which projects to the front from a frame-work journaled to the axle at the points D upon either side of the center of the axle, the frame-work or pole serving also to support the driver's seat E. A second frame-work, F, has boxes, as shown at G, by which it is supported from the axle. This frame-work projects forward and outward to the right-hand side of the machine, and has hinged joints at H, to which the sickle-bar I is connected. This sickle-bar has two knives, J J, fitted in it, one lying above the other, so that they may be caused to reciprocate in opposite directions for the purpose of cutting the grass through which they pass. The outer ends of these sickles have longitudinal slots corresponding, so as to receive a bolt or pin upon which they move and are guided, the pin passing through the cutter-bar, so as to hold them in place.

At the outer end of the sickle-bar is a shoe, K, which travels upon the ground and serves to divide the grass to be cut from that which remains standing, and from the inner end of the bar an arm, L, projects having a wheel or roller, M, journaled in it, so as to run upon the ground and support the inner end of the sickle-bar. The shaft of this wheel passes through a vertical slot, N, in the bar L, and has a nut or other means for adjusting it up or down to raise or lower this end of the sickle-bar, and thus adjust it to the height at which it is desired to cut. A similar slot, N', is made in the bar, to which the front end of the shoe K is hinged or pivoted, so that the rear end of this shoe may be raised or lowered to correspond with the movement of the wheel M. The inner end of the upper sickle is connected with one end of a horizontal vibrating lever, O, and the corresponding end of the lower sickle is connected with the opposite end of this lever, which is centrally pivoted to that end of the sickle-bar I. The connecting-arm of this cutter extends beyond the end of the lever O, and has a joint-connection at P with the pitman or connecting-rod Q, by which it is caused to reciprocate, the motion being thus communicated directly to the lower cutter, and at the same time the horizontal lever O is caused to oscillate upon its fulcrum-pin, so that through its connection with the other sickle J that will be caused to reciprocate in the opposite direction from the one which receives the direct motion. The pitman Q is connected with a horizontal lever, R, which has its fulcrum upon the central and forward portion of the frame F. The outer end of this lever is connected with the pitman Q by a universal joint, (shown at S,) which allows the relative position of the two to be changed without interfering with their freedom of motion, as will be hereinafter described.

The inner end of the lever R has an anti-friction roller, T, journaled upon it, and this roller lies in the zigzag or cam groove U of the wheel V, which is secured to the central portion of the axle A. This cam-wheel V is preferably made in two parts, which can be put upon the shaft and secured together after being completed, so that either portion may be taken off or renewed independently of the other.

As both the pole C and the frame F are loosely journaled upon the axle A, it will be seen that they have independent movements about the axle. In order to raise or lower the frame F with reference to the pole C, which is steadily supported by the team, I employ a lever, W, which is journaled to one side of the pole and has an arm, X, projecting from its lower end, with means for attaching a chain or other connecting device, Y, to it. This chain has its lower end fixed to the front portion of the frame F, as shown, and it will be manifest that any link in the chain may be attached to the hook or projection X, so as to adjust the distance between the front of the frame F and the end of the lever, and thus regulate the height to which the frame may be raised by the movement of the lever. The front portion of the lower end of the lever has rack-teeth $a$ formed upon it, and a pawl, $b$, is hinged to the tongue, so as to engage with these teeth, being held in contact by a spring, $c$.

It will be seen that when the lever W is drawn back the frame F will be raised up with relation to the pole C, and when it is desired to lower this frame and sickle the driver simply lifts the pawl $b$ with his toe, thus releasing the lever and allowing it to be moved forward.

As the wheels B B turn loosely upon the outer end of the axle A, it will be manifest that no motion will be communicated to the cam-wheel V, which is keyed to the axle, unless some means is provided to fix the wheels to the axle also. This I do by means of clutches $d$ $d$, and the inner ends of the hubs are notched, so as to be engaged by the outer ends of the clutches, which are formed upon sleeves that extend into the hub, as shown. The clutches slide upon feathers on the axle, and are moved inward or outward by means of clutch-levers $e$, which are pivoted to the rear portion of the frame F and have suitable projections by which they may be moved. These levers are preferably held in position by pins $f$ on the frame, so that when moved in one direction they will throw the clutches out of contact with the wheel-hubs, thus allowing the wheels to rotate freely without driving the cam-wheel V, which is desirable when the machine is simply traveling from place to place. One arm of these levers is made elastic, so as to allow the clutches to disengage if the machine or either wheel turns backward.

When it is desired to operate the sickle, the clutches are thrown in contact with the wheel, and the axle will then be caused to revolve with the wheels, carrying with it the cam-wheel V, the cam-groove of which acts upon the inner end of the lever R, and through it drives the pitman Q, the oscillating lever O, and the double-reciprocating sickles.

Having thus described my invention, what I claim as new, and desire to secure by Letters Patent, is—

1. In a mowing-machine having the two oppositely-reciprocating knife-bars, the vibrating lever and actuating cam-wheel, and the pitman connecting the vibrating lever with one of the sickles, in combination with a horizontal lever with a central fulcrum having its opposite ends connected with the upper and lower sickles, respectively, substantially as herein described.

2. In a mowing-machine, the wheel axle having the pole and sickle frames independently journaled upon it and adjustable with relation to each other, in combination with a cam-wheel fixed upon the wheel-axle, a vibrating lever, a pitman, two reciprocating knife-bars, and a horizontal centrally-fulcrumed lever having its ends connected with the upper and lower sickles, respectively, in combination with the universal joint S, connecting the pitman and the vibrating lever, whereby the sickle-frame may be raised or lowered without interfering with the action of the joint, substantially as herein described.

In witness whereof I have hereunto set my hand.

BENTON ELMORE.

Witnesses:
GEO. H. STRONG,
S. H. NOURSE.